(No Model.)

E. THOMSON.
ELECTRIC MOTOR.

No. 335,547. Patented Feb. 2, 1886.

Witnesses:
Ernest Abshagen
Thos. Toomey

Inventor:
Elihu Thomson
By his Attorney: H. C. Townsend

UNITED STATES PATENT OFFICE.

ELIHU THOMSON, OF LYNN, MASSACHUSETTS.

ELECTRIC MOTOR.

SPECIFICATION forming part of Letters Patent No. 335,547, dated February 2, 1886.

Application filed January 15, 1885. Serial No. 152,950. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Motors, of which the following is a specification.

My invention relates to a means for controlling or governing the speed of electric motors; and its object is to provide a compensation for a diminution of load and consequent tendency to increase of speed.

My invention consists in the combination, with an electric motor, of a variable resistance in a branch around the field-magnet, and devices responsive to changes in the speed of rotation of the armature for controlling the set or adjustment of said variable resistance. Such devices may be either an electro-magnet properly connected so as to respond to changes in the counter electro-motive force of the armature, due to a change of speed, or may be a speed indicator or governor of any desired type, working mechanically by changes of the speed of rotation of the armature.

Figure 1:
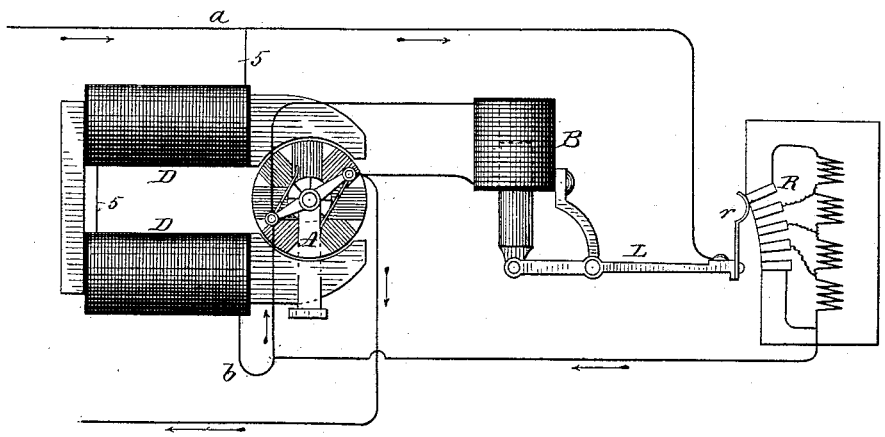
Figure 2:
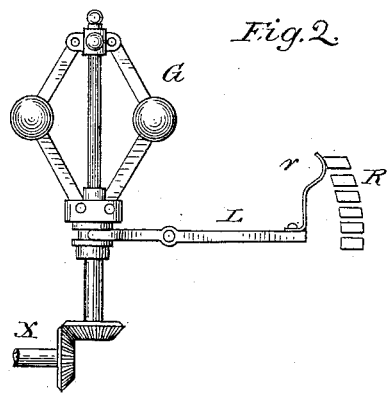

Figure 1 of the accompanying drawings shows diagrammatically an arrangement of circuits and apparatus for carrying out my invention. Fig. 2 illustrates a speed governor or indicator that may be employed for actuating or controlling the devices for setting or adjusting the variable resistance, used after the manner illustrated in Fig. 1.

Referring to Fig. 1, A indicates the armature of an electric motor, and D D charging or energizing coils upon the field-magnet, said coils being in a circuit with any suitable source of electricity, but preferably connected to the circuit supplying current to the armature of the motor.

In the diagram Fig. 1 the coils D are shown as in direct circuit with the armature, and this is a preferred arrangement.

In carrying out my invention I propose to employ any suitable means for weakening the field-magnetism as developed by the action of current in the charging or energizing circuit or branch 5, containing such coils, either by varying the flow of current in such branch by varying the number or action of the coils, or in any other suitable manner, the devices for producing such variations being controlled or governed automatically, in accordance with variations in the counter electro-motive force of the armature under variations of load and speed.

In the arrangement shown in Fig. 1, the strength of the field-magnet is diminished by diminishing the flow of current in the whole number of coils by a variable resistance around the coils, and the action is governed by an electro-magnet increasing in power through the increase of counter electro-motive force in the armature attendant upon a diminution of load and increase of speed. B indicates such an electro-magnet, whose coils, as shown, are in a branch or derived circuit around the armature, and whose core or armature is connected to a lever, L, which serves to adjust a variable resistance or rheostat, R, in a branch around the field-magnet-energizing circuit 5, so as to shunt current from such coil or circuit to a greater or less degree. The variable resistance R is of any desired form, that shown consisting simply of a sectional resistance connected between the sections to a series of contacts over which passes a spring or switch, *r*, operated by lever L. The circuit is to the resistance on one side and out through the spring *r*, whose position determines the number of sections that shall be in circuit. The branch containing coil B is preferably of high resistance. Upon an increase of speed of the armature A, consequent upon a diminution of load, the counter electro-motive force of the armature increases, thus forcing more current into the coil B to an extent sufficient to cause the latter to lift its armature and move the lever L and contact *r*, thus diminishing the resistance in R, and shunting more current from the charging-circuit containing coils D D, so as to diminish the strength of the field-magnet. Upon low speed the core of B is released and the lever L moves so as to increase the resistance in R, and thereby force more current into coils D D, so as to increase the strength of the field-magnet. In practice an intermediate position is maintained at average speeds.

The variable resistance, arranged as described in connection with Fig. 1, might be controlled by other means responsive to changes in the load and speed of the motor instead of by an electro-magnet, B. Thus, for instance, a mechanical speed indicator or governor may be used for operating upon the switch or other device through which the set or adjustment of the variable resistance, arranged as shown in Fig. 1, is determined. Such a governor is shown in Fig. 2.

G indicates a centrifugal governor of well-known type, driven from shaft X, which may be the armature-shaft or any other shaft moving therewith. The part of said governor whose movement is the gage of the speed is connected to the lever L, so as to communicate movement thereto after the manner that a steam-engine governor moves the throttle-valve of an engine. The lever L in turn controls in the manner already described adjustment of the variable resistance in a branch around the field-magnet coils.

My invention is especially designed for application to electric motors used on lines or circuits on which a constant or uniform current is made to flow under all conditions of the external or working circuit.

My invention is obviously not limited to peculiarities in the details of switches, artificial resistances, or other elements making up the combinations claimed, but consists of the broad combinations of elements having the functions or capacities that permit them to do the work in conjunction with the effects stated.

Modifications in the arrangement and operation of parts adapting the motor to be used upon mains having constant differences of electro-motive force will be made the subjects of separate applications.

In the operation of my present invention I prefer the employment of the centrifugal speed-indicator, Fig. 2, as more reliable and certain in its action than the electro-magnetic appliance of Fig. 1.

What I claim as my invention is—

1. The combination, with an electric motor, of a field-magnet-energizing coil in circuit with the armature, a variable resistance in a branch around said coil and controlling the flow of current in said coil, and an automatic controlling mechanism operated or controlled by variations in the speed of rotation of the motor for setting or adjusting said resistance, as and for the purpose described.

2. The combination, with an electric motor, of a field-magnet-charging coil, a variable resistance in a branch around the same, and a mechanism controlled by variations in the speed of rotation of the motor for controlling the set or adjustment of the resistance, so as to gradually and directly vary the magnetic field in which the armature revolves in accordance with changes in the load of the motor when operated upon a constant current line.

3. The combination, with an electric motor on a circuit conveying current from any suitable source, of a variable resistance in a branch around a field-magnet coil, and an electro-magnet responsive to changes in the counter electro-motive force of the armature as determined by variation of load or speed for setting or controlling the adjustment of said variable resistance.

4. The combination, with an electric motor having its armature and field coils arranged in series, of a variable resistance in a derived circuit around the field only, and a controlling electro-magnet in a derived circuit around the armature only, substantially as shown and described.

Signed at Lynn, in the county of Essex and State of Massachusetts, this 3d day of January, A. D. 1885.

ELIHU THOMSON.

Witnesses:
E. J. RICHARDS,
E. W. RICE, Jr.